Patented Jan. 25, 1938

2,106,523

UNITED STATES PATENT OFFICE 2,106,523

COMPLEX RESINOUS BODY AND PROCESS OF MAKING SAME

Carleton Ellis, Montclair, N. J., assignor to Ellis-Foster Company, a corporation of New Jersey No Drawing. Application July 31, 1935, Serial No. 34,050

6 Claims. (Cl. 260—8)

This invention relates to alkyd resins made in the presence of a substance which retards the polymerization of the polyhydric alcohol-polybasic acid complex. In particular it refers to the production of glyceride oil-modified alkyd resins in the presence of urea or urea derivatives, which act as anti-polymerizing agents.

In my copending application Serial No. 226,826, entitled "Resin or balsam prepared with the aid of a reaction modifier and process of making same", filed Oct. 17, 1927, Patent No. 2,056,656 of which the present application is a continuation in part, I have described and claimed resins of the polyhydric alcohol-polybasic acid type, including resins made in the presence of organic bases such as amines and amino compounds or other substituted ammonias.

With certain exceptions, both as to process and reactants, it may be stated that in general glyceride oils cannot be reacted directly into a polyhydric alcohol-polybasic acid nucleus to form a soluble product of homogeneous appearance. It is an object of this invention to control (i. e., retard) the reaction between polybasic acid and polyhydric alcohol to such an extent that glyceride oils (particularly drying oils) and/or oil acids can be combined into the resin complex with the formation of soluble homogeneous reaction products.

Another object is to prepare resins of harder and tougher nature than can be obtained when urea or a like modifier is not used. For example, as low as 1% of urea based on the raw mix has been found to check the formation of an infusible polymer from phthalic anhydride and glycerol sufficiently so that a more completely reacted but soluble product is obtained which can be further modified with a drying oil.

The preferred method of carrying out my invention involves in a specific form the heating of a mixture of phthalic anhydride, glycerol and a modicum of urea or thiourea until a resin is formed, and dispersion of this resin in a drying oil by heating. Various modifications of procedure may be adopted. For example, the drying oil may be added to the mixture of phthalic anhydride, glycerol and urea and the mass heated until a homogeneous blend is formed. Other procedures involve combining the antipolymerization agent with one of the reactants (polybasic acid, glycerol or drying oil), followed by incorporation of the other reactants in the product thus obtained. Phthalic anhydride and urea may be preliminarily heated together and then glycerol and drying oil added. Glycerol and urea may be heated as a first step, followed by addition of drying oil and phthalic anhydride, this procedure, however, being less desirable since it results in a darker colored product. Also, the drying oil may be heated with urea partially to sensitize the oil and render it better capable of blending to form a homogeneous product.

The following examples illustrate the manner and effect of using anti-polymerization catalysts in the making of alkyd resins, modified or capable of being modified with a drying oil.

Example 1.—Molecular proportions (one gram-molecule each) of ethylene glycol and diphenic acid were heated with 1 per cent of urea, based on the total weight of the mixture. On heating for ½ hour at 290° C. a viscous light amber colored synthetic balsam was obtained which was soluble in a mixture of equal volumes of toluol and butyl acetate. The acid number was 22.4.

Example 2.—Equimolecular proportions of diethylene glycol and tetrachlorphthalic acid with 1 per cent of urea were heated to 260° C., yielding a viscous reddish brown balsam insoluble in toluol, but soluble in various mixed solvents such as a mixture of equal parts of toluol, butyl acetate and butyl alcohol. The solution had a yellow fluorescence.

Example 3.—Triethylene glycol and succinic acid in equimolecular proportions were heated with 1 per cent of urea to 290° C. and held at this temperature for ½ hour, yielding a soft sticky balsam of light amber color, with acid number of 21.6 and soluble in mixed nitrocellulose solvents.

Example 4.—46 parts glycerol, 111 parts phthalic anhydride and 10 parts urea were heated at atmospheric pressure to 290° C. for 1 hour without polymerization to form infusible products. A resin resulted which had properties quite different from the phthalic glyceride product made without urea. Thus the urea treated material had better solubility, being soluble in benzol, toluol, butyl acetate and in mixtures of these solvents. A solution of the resin in a mixture of benzol and butyl acetate in which nitrocellulose was likewise dissolved, yielded a good film. The acid number of this resin was 51.

Example 5.—Using the same proportions but keeping the temperature at a somewhat lower point, namely, 270–275° C., a lighter colored resin resulted, which was hard and strong, and having an acid number of 31.2 and a melting point of 96–97° C. It was soluble in benzol, toluol, butyl acetate and their mixtures. Using the same proportions but heating at atmospheric pressure to 240–250° C. for 3½ hours, a hard brittle resin having a melting point of 80–81° C. and an acid number of 35 resulted. While soluble in toluol and in a mixture of toluol and butyl acetate, the solubility of the resin was somewhat lower than the last two described above.

*Example 6.*—Phthalic anhydride 74 parts, glycerol 31 parts, and urea 3 parts were heated at atmospheric pressure, using an air-cooled reflux condenser, but no agitation. The temperature was raised to 230° C. and maintained for 1 hour between about 235 and 240° C. Polymerization to infusible bodies did not occur, although without the urea such action would have occurred within a few moments after reaching 235° C. At this temperature a light colored resin results. The resin was found to be soluble in acetone and in a mixture of alcohol and benzol.

*Example 7.*—A mixture of 123 parts glycerol, 148 parts phthalic anhydride, 202 parts sebacic acid and 14 parts urea was heated for 2 hours at 290° C. A sticky resinous product resulted.

The above examples make use of urea as the reaction modifier. Thiourea can also be used, and in the respect of modifying the resin-forming reaction biuret has properties similar to urea. The next example uses p-phenetylurea.

*Example 8.*—Para phenetylurea was added in the amount of 10 per cent to a partially resinified product made from 111 parts phthalic anhydride and 46 parts glycerol. On heating at atmospheric pressure up to 290° C. a very light colored hard resin was obtained soluble in a mixture of benzol and alcohol.

In accordance with this invention the resins of the above examples may be further modified by treatment with a drying oil.

*Example 9.*—Seventy parts of the resin of Example 4 and 100 parts of linseed oil were heated at 300° C. for a half hour. A thick homogeneous mass resulted which was soluble in toluene, butyl acetate and acetone; partially soluble in alcohol and mineral spirits. When the resin is modified with a large amount of drying oil it is soluble in mineral spirits.

*Example 10.*—Likewise, 70 parts of the resin of Example 6 and 100 parts of linseed oil were heated at 300° C. The resin dispersed in the oil after heating the mixture for about a half hour and a product similar to that of Example 9 was obtained. The resin dissolved in xylene forms a film which dries in about 4 hours when driers are added to the solution.

*Example 11.*—Five parts of urea, 23 parts glycerol, 6.2 parts diethylene glycol and 55 parts phthalic anhydride were heated to 220° C. forming a pale yellow resin. 40 parts linseed oil was added and the temperature raised to 300° C. The oil blended with the resin forming a light brown, tough, soluble resin.

*Example 12.*—Twenty parts of urea and 100 parts linseed oil were heated at 200° C. until gas evolution ceased. The resulting turbid, light-colored oil was mixed with 46 parts glycerol and 111 parts phthalic anhydride and heated to 300° C. A major portion of the phthalic glyceride which formed dispersed in the oil but a small amount remained undissolved. Addition of 10 parts urea resulted in complete dispersion of the resin on heating further at 300° C. The product was an amber colored mass soluble in toluene, butyl acetate or acetone.

*Example 13.*—A mixture of 15 parts urea, 46 parts glycerol and 100 parts linseed oil was heated for 45 minutes at 250° C. To 50 parts of the oil thus treated there were added 40 parts phthalic anhydride and heating was carried on for 20 minutes at 250° C. and finally raising the temperature to 300° C. for 5 minutes. A homogeneous amber colored resin resulted.

The polybasic acid suitable for use in this invention may be phthalic or any equivalent thereof. Instead of glycerol there may be used glycols, polyglycols, polyglycerols, pentaerythritol, ethanolamines, mannitol and the like.

Linseed oil may be replaced by another glyceride oil such as perilla, soya bean, sunflower, walnut or fish oils. These oils, including linseed, may be raw or blown, heat-bodied or otherwise altered. On account of the heat-treatment necessary for incorporating the oil, tung and oiticica oil are less readily applicable but they can be used in mixture with, say, equal parts of oils less sensitive to heat.

Solutions of the resins are used as coating compositions which are air-dried or baked. Addition of metallic driers (linoleate, resinate or naphthenate salts of lead, cobalt or manganese) accelerate hardening of the films. Other additions to the solutions, depending upon the type of coating desired, include natural resins, rosin ester, rosin-phthalic-glyceride or soluble phenol-aldehyde resins.

Resins which have been reacted in an extensive manner in the presence of a reaction-modifier or an anti-polymerization catalyst of the urea type are usually considerably more viscous in solution than resins made without the catalyst and reacted as far as possible while preserving solubility. Thus it appears that the complex obtained by using the anti-polymerization catalyst is of higher molecular weight. Moreover, the durability of resins of this general type appears to increase as the viscosity in solution increases and as the toughness of the solid resin becomes enhanced. Using urea in this manner, I have been able to secure resins and balsams which not only are useful in conjunction with nitrocellulose to make lacquers, but also may be used without lacquer to form a coating.

What I claim is:

1. The process which comprises reacting a relatively small amount of a urea with a polyhydric alcohol, a polycarboxylic acid and a glyceride oil.

2. The product obtained by the process of claim 1.

3. A resinous product comprising glycerol, a polycarboxylic acid, urea and fatty acids of a glyceride oil in chemical combination.

4. A resinous reaction product comprising glycerol, phthalic anhydride, urea and the fatty acids of a glyceride oil in chemical combination.

5. The process which comprises reacting a relatively small amount of a urea with a polyhydric alcohol, phthalic anhydride and a glyceride oil.

6. The product obtained by the process of claim 5.

CARLETON ELLIS.